May 1, 1934.                L. B. GRAY                1,957,263

RECEPTACLE PROTECTOR

Filed Sept. 13, 1933

INVENTOR,
Lois B. Gray.
BY
ATTORNEY.

Patented May 1, 1934

1,957,263

UNITED STATES PATENT OFFICE 1,957,263

RECEPTACLE PROTECTOR

Lois B. Gray, Kansas City, Mo.

Application September 13, 1933, Serial No. 689,240

7 Claims. (Cl. 65—53)

This invention relates to receptacle protectors especially adapted for attachment to such receptacles as tumblers, goblets, pitchers, or other containers for the purpose of precluding the escape from the surfaces thereof of condensate and moisture or overflowing liquid which might gravitate to the lower portion of the receptacle.

One of the important aims of the instant invention is the provision of a receptacle protector that will function in a manner as disclosed in my United States Letters Patent No. 1,924,926, issued August 29, 1933, but is made to present a homogeneous structure that is easy to apply, may be used over and over again, and may be manufactured and distributed at an extremely low cost.

Another object of this invention is the contemplation of the provision of such a receptacle protector having as a part thereof, a number of opposed, inwardly directed, flexible tongues that serve not only to engage a receptacle to hold the protector in place, but also to maintain a sheet of absorbent material in position against accidental displacement.

Minor objects of the invention, including specific structural features of my improved receptacle protector will appear during the course of the following specification, referring to the accompanying drawing, wherein.

Figure 1:
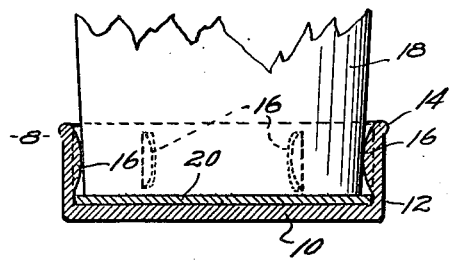
Figure 1 is a vertical, central section through a receptacle protector made in accordance with one form of the present invention, said protector being associated with one type of a well known glass tumbler.

In the manufacture of receptacle protectors contemplated by this invention, all forms shown in the drawing might be made of rubber or similar resilient substance that is molded or otherwise formed to present the types illustrated. In all forms it is desired that the receptacle have the property of being quickly moved to and from the operative position, such movement requiring no adjustment of any nature since the gripping tongues flex to a position where they frictionally engage the tumbler or goblet, as the case may be.

Figure 2:
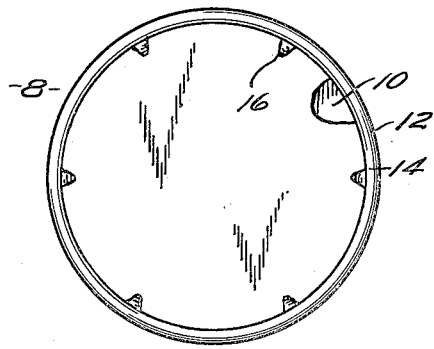
Fig. 2 is a top plan view of the same form of receptacle removed from the tumbler.

In Figs. 1 and 2 the receptacle protector comprises a body 8 having a disk-shaped bottom 10 that is slightly flexible, yet rigid enough to retain its body and to preclude any collapsing which might be objectionable.

An upstanding annular wall 12 having a bead 14 formed at the upper or free edge thereof extends from bottom 10 and is more flexible than said bottom 10 in order to permit free radial expansion and also to exert a slight inward radial pressure when the opposed gripping tongues 16 are frictionally engaging tumbler 18. As shown in Fig. 2, tongues 16 taper as their free or innermost edges are approached and in this form of protector these tongues are longitudinally arched so that they overhang bottom 10 and provide a space to receive a disk-shaped sheet of absorbent material 20 that lies between bottom 10 of body 8 and tumbler 18. Obviously, as moisture gravitates to the bottom of tumbler 18 it will pass down through the passage formed between the side of tumbler 18 and the inner face of wall 12 and be absorbed by element 20. Tongues 16 flex slightly and this form of construction allows tumblers of different diameters to be inserted into bodies 8 of a single size. Bead 14 strengthens the upper part of wall 12 and precludes objectionable flaring when the receptacle is in position. This bead 14, therefore, should be large enough in diameter to maintain wall 12 in the position shown.

Figure 3:
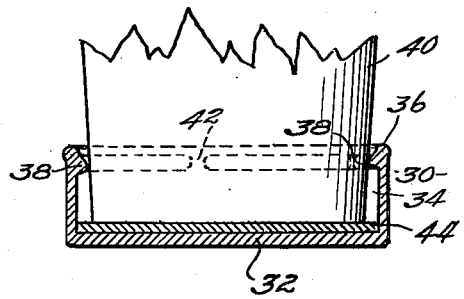
Fig. 3 is a vertical, central cross section through a receptacle protector in operative position and made to embody another form of the invention.
Figure 4:
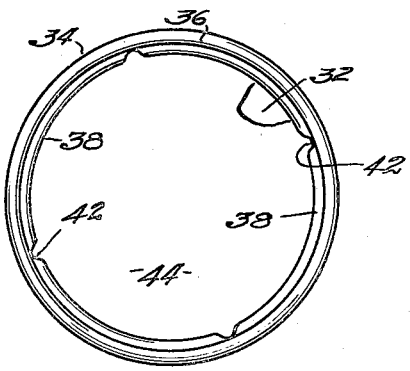
Fig. 4 is a top plan view of the protector shown in Fig. 3 and removed from operative relation with the tumbler.

Figs. 3 and 4 illustrate another form of protector embodying the invention and consists of a body 30 that is made, as before mentioned, to present the bottom 32 and a wall 34 that has a bead 36 formed around the upper edge thereof for the aforesaid purpose. Instead of tongues extending vertically or transversely of the upstanding wall as before described, gripping tongues 38 present a substantially continuous inwardly directed flange which frictionally engages tumbler 40 as shown.

Notches or the space 42 between the ends of these inwardly directed tongues 38 allows the passage of moisture into the body of the protector where it may be absorbed by the sheet of absorbent material 44 that is in the bottom of the receptacle protector. Upon the insertion of tumbler 40, tongues 38 will flex downwardly and frictionally engage the tumbler to preclude its displacement.

Figure 5:
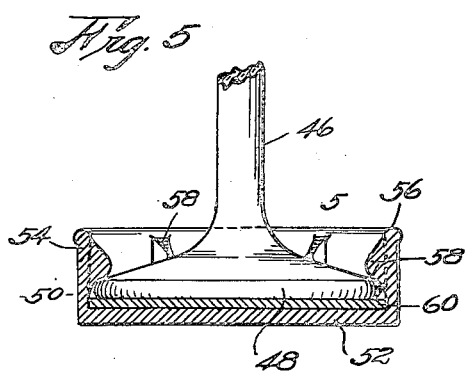
Fig. 5 is a vertical, central section through a receptacle protector made in accordance with the form of the invention which permits its use with a goblet, and, Fig. 6 is a top plan view of the protector shown in Fig. 5, but without association with the goblet.
Figure 6:
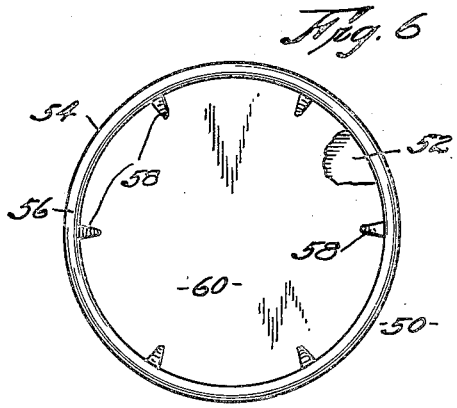

Figs. 5 and 6 show the manner in which a receptacle protector might be made to accommodate goblets or the well known glass vessel that is used for household purposes having a stem 46 and a standard 48. In this instance body 50 is made of rubber or similar resilient material and has a bottom 52 that is flexible, yet rigid enough to maintain a given shape. The side wall 54 has a bead 56 formed therearound for purposes aforesaid and inwardly directed tongues 58 are flexed when goblet standard 48 is moved to the position illustrated in Fig. 5. Tongues 58 are more pointed and should be inwardly directed a greater distance for this form of protector because standard 48 is overhung by all of the opposed tongues 58 when the parts are assembled. A sheet of absorbent material 60 is positioned in the bottom of body 50 to collect moisture gravitating along stem and standard 46 and 48 respectively. When this standard 48 is moved to position tongues 58 will flex laterally and wall 54 will be distended sufficiently to allow the entrance of standard 48, after which the entire body 50 will assume its original shape.

Having thus described the invention, what is claimed as new and desired to be secured by Letters Patent is:

1. A receptacle protector comprising a body adapted to receive the lower portion of the receptacle; and a series of vertical resilient gripping tongues formed on the body to engage the receptacle to maintain the same in position, said body having a slightly flexible bottom and a resilient and flexible upstanding side wall more flexible than said bottom, said gripping tongues being formed integrally with said side wall.

2. A receptacle protector comprising a body adapted to receive the lower portion of the receptacle; and a series of spaced-apart, resilient gripping tongues formed on the body to engage the receptacle to maintain the same in position, said body having a slightly flexible disk-shaped bottom, an upstanding resilient and flexible side wall extending from the bottom, and a bead formed along the edge of said wall, said gripping tongues being formed by the side wall below said bead formed on the latter.

3. A receptacle protector comprising a body adapted to receive the lower portion of the receptacle; and a series of vertical resilient gripping tongues formed on the body to engage the receptacle to maintain the same in position, said body having a slightly flexible disk-shaped bottom, and a resilient and flexible upstanding side wall more flexible than said bottom, said tongues being formed integrally with the said side wall and extending radially inwardly in opposed relation.

4. A receptacle protector comprising a body adapted to receive the lower portion of the receptacle; and a series of vertical resilient gripping tongues formed on the body to engage the receptacle to maintain the same in position, said body having a slightly flexible disk-shaped bottom, and a resilient and flexible upstanding side wall more flexible than said bottom, said tongues being formed integrally with the said side wall and extending radially inwardly in opposed relation, said tongues overhanging the said disk-shaped bottom.

5. A receptacle protector comprising a body adapted to receive the lower portion of the receptacle; and a series of vertical resilient gripping tongues formed on the body to engage the receptacle to maintain the same in position, said body having a slightly flexible disk-shaped bottom, a resilient and flexible upstanding side wall more flexible than said bottom, said tongues being formed integrally with the said side wall and extending radially inwardly in opposed relation, said tongues overhanging the said disk-shaped bottom, and a sheet of absorbent material resting on the bottom of said body beneath the said overhanging tongues.

6. A receptacle protector comprising a body adapted to receive the lower portion of the receptacle; and a series of vertical resilient gripping tongues formed on the body to engage the receptacle to maintain the same in position, said body having a slightly flexible bottom and a resilient and flexible upstanding side wall more flexible than said bottom, said gripping tongues being formed integrally with said side wall, and progressively decreasing in thickness as their free edges are approached.

7. A receptacle protector comprising a bottom member; a resilient and flexible upstanding wall integral with said bottom member and comprising a series of spaced-apart, vertical receptacle-gripping tongues; and an absorbent pad overlying the bottom member beneath all of the tongues, said tongues having their inner vertical edges longitudinally arched to dispose the central portion of said edge a greater distance inwardly from the wall than the ends of said vertical edges.

LOIS B. GRAY.